United States Patent
Yeager et al.

(10) Patent No.: US 7,959,808 B2
(45) Date of Patent: Jun. 14, 2011

(54) POLYSULFONE MEMBRANES METHODS AND APPARATUSES

(75) Inventors: Gary William Yeager, Rexford, NY (US); Liming Yu, Clifton Park, NY (US); Daniel Steiger, Bedminster, NJ (US); Yanshi Zhang, Shaker Heights, OH (US)

(73) Assignee: General Electric Company, Niskayuna, NY (US)

( * ) Notice: Subject to any disclaimer, the term of this patent is extended or adjusted under 35 U.S.C. 154(b) by 274 days.

(21) Appl. No.: 12/262,643

(22) Filed: Oct. 31, 2008

(65) Prior Publication Data

US 2010/0108607 A1    May 6, 2010

(51) Int. Cl.
*B01D 61/00* (2006.01)
*B01D 39/00* (2006.01)
*B01D 53/22* (2006.01)

(52) U.S. Cl. .............. 210/651; 210/650; 210/321.6; 210/321.75; 210/500.41; 210/500.42; 210/500.37; 210/500.38; 96/4; 96/14

(58) Field of Classification Search .......... 210/500.27, 210/500.41, 651, 652, 500.23, 500.42, 500.3, 210/500.37, 321.6, 321, 758; 95/45; 521/27; 96/4, 14

See application file for complete search history.

(56) References Cited

U.S. PATENT DOCUMENTS

| 4,894,159 A | | 1/1990 | Guiver et al. | |
|---|---|---|---|---|
| 4,969,981 A | * | 11/1990 | Rogers et al. | 205/466 |
| 5,846,428 A | * | 12/1998 | Martin et al. | 210/651 |

(Continued)

FOREIGN PATENT DOCUMENTS

DE        19961040         12/1999

(Continued)

OTHER PUBLICATIONS

PCT International Search Report dated Jan. 21, 2010.

(Continued)

*Primary Examiner* — Ana M Fortuna
(74) *Attorney, Agent, or Firm* — Eileen W. Gallagher

(57) ABSTRACT

The present invention relates to methods and apparatuses for water filtration comprising contacting a water stream with a membrane comprising a polysulfone having structural units of Formula I

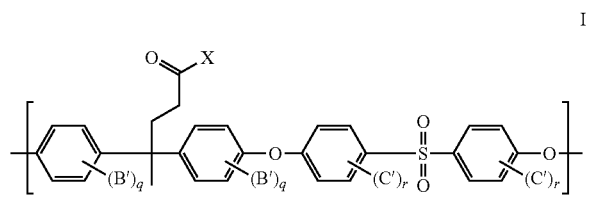

wherein X is OH, $NR^1R^2$, or $OR^3$; $R^1$ and $R^2$ are independently at each occurrence hydrogen, a $C_1$-$C_{5000}$ aliphatic radical, a $C_3$-$C_{12}$ cycloaliphatic radical, a $C_3$-$C_{12}$ aromatic radical, a polypeptide, a combination thereof, or $R^1$ and $R^2$ taken together form a 5- or 6-membered aliphatic ring or a 5-membered aromatic ring; $R^3$ is a $C_1$-$C_{20}$ aliphatic radical, $C_3$-$C_{12}$ cycloaliphatic radical, $C3$-$C_{12}$ aromatic radical, or a combination thereof; B' and C' are independently at each occurrence a nitro group, $C_1$-$C_{20}$ aliphatic radical, $C_3$-$C_{12}$ cycloaliphatic radical, $C_3$-$C_{12}$ aromatic radical, or a combination thereof; and q and r are independently at each occurrence 0 to 4. The present invention also relates to a method and apparatus for gas separation, the method comprising contacting a gas stream with a membrane comprising a polysulfone having structural units of Formula I.

20 Claims, 1 Drawing Sheet

U.S. PATENT DOCUMENTS

| | | | | |
|---|---|---|---|---|
| 5,851,394 | A | * 12/1998 | Shibata et al. | 210/500.23 |
| 6,103,117 | A | 8/2000 | Shimagaki et al. | |
| 6,146,854 | A | * 11/2000 | Koster et al. | 435/91.1 |
| 7,285,352 | B2 | * 10/2007 | Yoshimoto et al. | 429/437 |

FOREIGN PATENT DOCUMENTS

| | | |
|---|---|---|
| EP | 0855428 | 1/1998 |
| EP | 0855429 | 1/1998 |
| EP | 0855430 | 1/1998 |
| GB | 2182940 A | 5/1987 |
| JP | 63101425 A | 5/1988 |
| WO | WO0054103 | 9/2000 |
| WO | WO2008073530 A1 | 6/2008 |

OTHER PUBLICATIONS

Lau et al., "Performance of Polysulfone/Carboxylated Polysulfone Membranes", Polymer Internationa, vol. 33, pp. 413-417, 1994.

Weber, Martin, "In Situ Polysulfone-alloys", Annual Technical Conf. Society of Plastics Eng. (2001) 59th (vol. 2), 2222-2226.

Charoensirisomboon et al., "Pull-out of Copolymer in Situ-formed During Reactive Blending: Effect of the Copolymer Architecture", Polymer, (2000) 41(18), 6907-6912.

Rodewald et al., "Oligo (ether sulfones).Block Copolymers Via Condensation Reactions of Telechelic Oligo (ether sulfones) Bearing Phenolic Endgroups and Oligomeric-Diols", Macromolecules (1999) 32(5), 1697-1700.

Ritter et al., Oligo(ether-sulfones).1.Functionalized Oligo(ether sulfones) from 4,4-bis(4-hydroxyphenyl)pentanoic acid and bis(4-chlorophenyl)sulfone:synthesis, properties, and substitution of the chlorophenyl Groups, Macromolecular Reports (1996), A33(Suppl. 2) 103-115.

Koch et al., "Functionalized polysulfones from 4,4-bis(4-hydroxyphenyl) pentanoic acid, 2,2-isopropylidenediphenol and vbis(4-chlorophenyl) sulfone: synthesis, behavior and polymer analogous amidation of the carboxylic groups", Macrmolecular Chemistry and Physics (1994), 195(5) 1709-17.

Esser et al., "Modified poly(ether sulfone)/poly(ether ether sulfone)polymers: approaches to pendent carboxyl groups", Polymer (1993) 34(13) 2836-44.

\* cited by examiner

POLYSULFONE MEMBRANES METHODS AND APPARATUSES

BACKGROUND

This invention relates generally to methods and apparatuses for water and gas filtration.

Hollow fiber ultrafiltration membranes have been employed in many purification systems. Polysulfones are widely used in these ultrafiltration membranes since they are known for their chemical resistance, good mechanical properties, and good thermal stability. However, polysulfones are typically hydrophobic and hollow fiber ultrafiltration membranes comprising hydrophobic polysulfones are subject to poor wettability and fouling when used in separation and filtration applications. Despite recent advances in the preparation of polysulfone compositions displaying enhanced hydrophilicity, further improvements and refinements in the performance characteristics of membranes comprising polysulfones are required. The present invention provides additional advances in the field of hydrophilic polyethersulfone compositions and their use in separation techniques employing membranes.

BRIEF DESCRIPTION

In one aspect, the present invention relates to a method for water filtration comprising contacting a water stream with a membrane comprising a polysulfone having structural units of Formula I

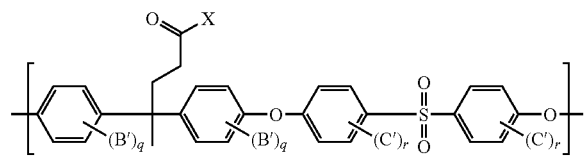

I wherein X is OH, $NR^1R^2$, or $OR^3$;

$R^1$ and $R^2$ are independently at each occurrence hydrogen, a $C_1$-$C_{5000}$ aliphatic radical, a $C_3$-$C_{12}$ cycloaliphatic radical, a $C_3$-$C_{12}$ aromatic radical, a polypeptide, a combination thereof, or $R^1$ and $R^2$ taken together form a 5- or 6-membered aliphatic ring or a 5-membered aromatic ring;

$R^3$ is a $C_1$-$C_{20}$ aliphatic radical, $C_3$-$C_{12}$ cycloaliphatic radical, $C3$-$C_{12}$ aromatic radical, or a combination thereof; B' and C' are independently at each occurrence a nitro group, $C_1$-$C_{20}$ aliphatic radical, $C_3$-$C_{12}$ cycloaliphatic radical, $C_3$-$C_{12}$ aromatic radical, or a combination thereof; and q and r are independently at each occurrence 0 to 4.

In another aspect, the present relates to a method for gas separation, the method comprising contacting a gas stream with a membrane comprising a polysulfone having structural units of Formula I.

In yet another aspect, the present invention relates to a water filtration apparatus comprising at least one membrane comprising a polysulfone having structural units of Formula I.

In yet another aspect, the present invention relates to a gas separation apparatus comprising at least one membrane comprising a polysulfone having structural units of Formula I.

DETAILED DESCRIPTION

Definitions

Figure 1:
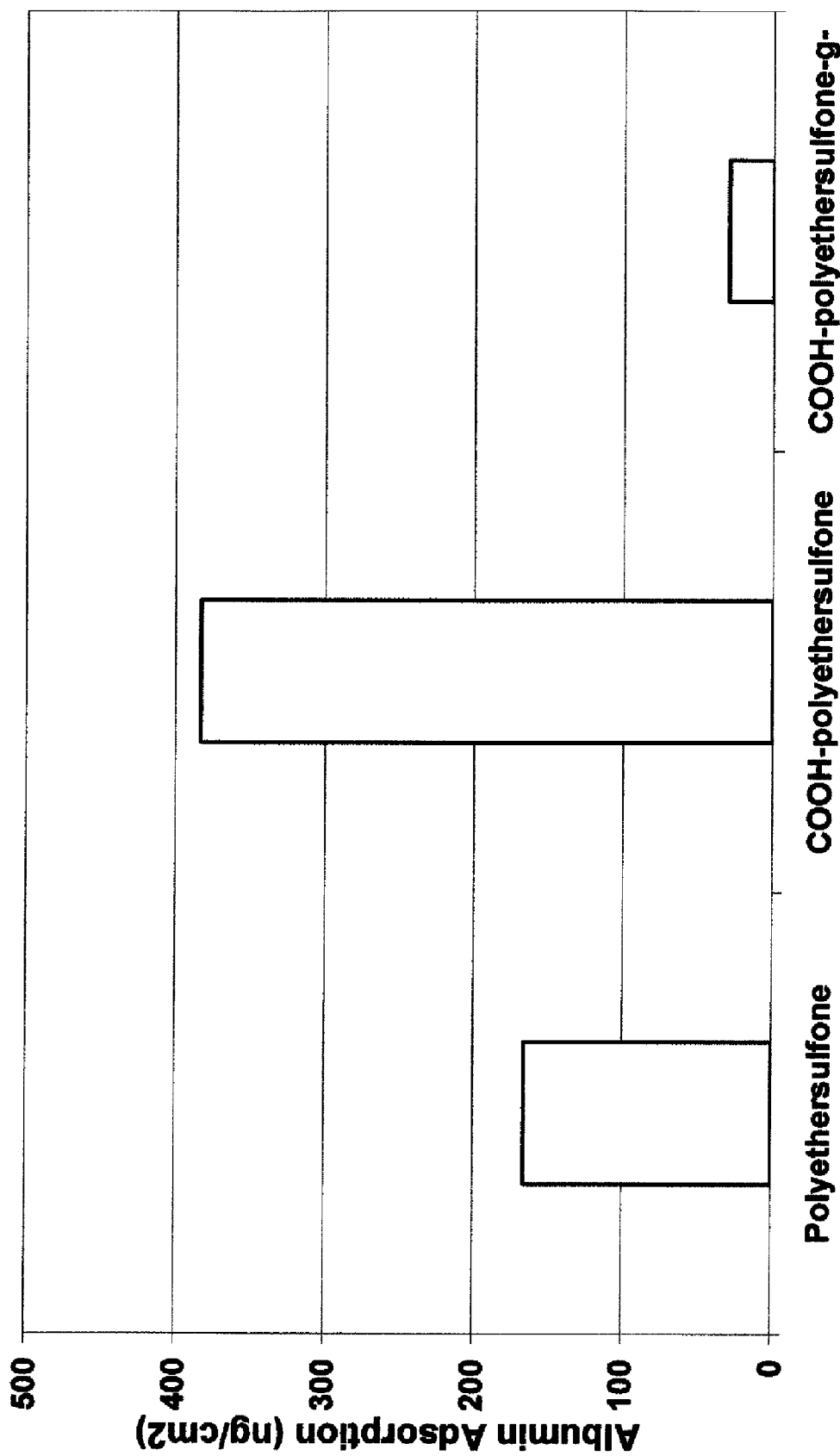
FIG. 1. is a graphical representation comparing albumin adsorption of the different membranes.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical, which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a C7 aromatic radical comprising a methyl group, the methyl group being a functional group which is an alkyl group. Similarly, the 2-nitrophenyl group is a C6 aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —$OPhC(CF_3)_2PhO$—), 4-chloromethylphen-1-yl, 3-trifluorovinyl-2-thienyl, 3-trichloromethylphen-1-yl (i.e., 3-$CCl_3Ph$-), 4-(3-bromoprop-1-yl)phen-1-yl (i.e., 4-$BrCH_2CH_2CH_2Ph$-), and the like. Further examples of aromatic radicals include 4-allyloxyphen-1-oxy, 4-aminophen-1-yl (i.e., 4-$H_2NPh$-), 3-aminocarbonylphen-1-yl (i.e., $NH_2COPh$-), 4-benzoylphen-1-yl, dicyanomethylidenebis(4-phen-1-yloxy) (i.e., —$OPhC(CN)_2PhO$—), 3-methylphen-1-yl, methylenebis(4-phen-1-yloxy) (i.e., —$OPhCH_2PhO$—), 2-ethylphen-1-yl, phenylethenyl, 3-formyl-2-thienyl, 2-hexyl-5-furanyl, hexamethylene-1,6-bis(4-phen-1-yloxy) (i.e., —$OPh(CH_2)_6PhO$—), 4-hydroxymethylphen-1-yl (i.e., 4-$HOCH_2Ph$-), 4-mercaptomethylphen-1-yl (i.e., 4-$HSCH_2Ph$-), 4-methylthiophen-1-yl (i.e., 4-$CH_3SPh$-), 3-methoxyphen-1-yl, 2-methoxycarbonylphen-1-yloxy (e.g., methyl salicyl), 2-nitromethylphen-1-yl (i.e., 2-$NO_2CH_2Ph$), 3-trimethylsilylphen-1-yl, 4-t-butyldimethylsilylphenl-1-yl, 4-vinylphen-1-yl, vinylidenebis(phenyl), and the like. The term "a C3-C10 aromatic radical" includes aromatic radicals containing at least three but no more than 10 carbon atoms. The aromatic radical 1-imidazolyl (C₃H₂N₂—) represents a C3 aromatic radical. The benzyl radical (C₇H₇—) represents a C7 aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group (C₆H₁₁CH₂—) is a cycloaliphatic radical, which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a C6 cycloaliphatic radical comprising a methyl group, the methyl group being a functional group which is an alkyl group. Similarly, the 2-nitrocyclobut-1-yl radical is a C4 cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —C₆H₁₀C(CF3)₂C₆H₁₀—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH₃CHBrCH₂C₆H₁₀O—), and the like. Further examples of cycloaliphatic radicals include 4-allyloxycyclohex-1-yl, 4-aminocyclohex-1-yl (i.e., H₂NC₆H₁₀—), 4-aminocarbonylcyclopent-1-yl (i.e., NH₂COC₅H₈—), 4-acetyloxycyclohex-1-yl, 2,2-dicyanoisopropylidenebis(cyclohex-4-yloxy) (i.e., —OC₆H₁₀C(CN)₂C₆H₁₀O—), 3-methylcyclohex-1-yl, methylenebis(cyclohex-4-yloxy) (i.e., —OC₆H₁₀CH₂C₆H₁₀O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC₆H₁₀(CH₂)₆C₆H₁₀O—), 4-hydroxymethylcyclohex-1-yl (i.e., 4-HOCH₂C₆H₁₀—), 4-mercaptomethylcyclohex-1-yl (i.e., 4-HSCH₂C₆H₁₀—), 4-methylthiocyclohex-1-yl (i.e., 4-CH₃SC₆H₁₀—), 4-methoxycyclohex-1-yl, 2-methoxycarbonylcyclohex-1-yloxy (2-CH₃OCOC₆H₁₀O—), 4-nitromethylcyclohex-1-yl (i.e., NO₂CH₂C₆H₁₀—), 3-trimethylsilylcyclohex-1-yl, 2-t-butyldimethylsilylcyclopent-1-yl, 4-trimethoxysilylethylcyclohex-1-yl (e.g., (CH₃O)₃SiCH₂CH₂C₆H₁₀—), 4-vinylcyclohexen-1-yl, vinylidenebis(cyclohexyl), and the like. The term "a C3-C10 cycloaliphatic radical" includes cycloaliphatic radicals containing at least three but no more than 10 carbon atoms. The cycloaliphatic radical 2-tetrahydrofuranyl (C₄H₇O—) represents a C4 cycloaliphatic radical. The cyclohexylmethyl radical (C₆H₁₁CH₂—) represents a C7 cycloaliphatic radical.

As used herein the term "aliphatic radical" refers to an organic radical having a valence of at least one consisting of a linear or branched array of atoms, which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C6 aliphatic radical comprising a methyl group, the methyl group being a functional group which is an alkyl group. Similarly, the 4-nitrobut-1-yl group is a C4 aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH₂CHBrCH₂—), and the like. Further examples of aliphatic radicals include allyl, aminocarbonyl (i.e., —CONH₂), carbonyl, 2,2-dicyanoisopropylidene (i.e., —CH₂C(CN)₂CH₂—), methyl (i.e., —CH₃), methylene (i.e., —CH₂—), ethyl, ethylene, formyl (i.e., —CHO), hexyl, hexamethylene, hydroxymethyl (i.e., —CH₂OH), mercaptomethyl (i.e., —CH₂SH), methylthio (i.e., —SCH₃), methylthiomethyl (i.e., —CH₂SCH₃), methoxy, methoxycarbonyl (i.e., CH₃OCO—), nitromethyl (i.e., —CH₂NO₂), thiocarbonyl, trimethylsilyl (i.e., (CH₃)3Si—), t-butyldimethylsilyl, 3-trimethyoxysilylpropyl (i.e., (CH₃O) 3SiCH₂CH₂CH₂—), vinyl, vinylidene, and the like. By way of further example, a C1-C10 aliphatic radical contains at least one but no more than 10 carbon atoms. A methyl group (i.e., CH₃—) is an example of a C1 aliphatic radical. A decyl group (i.e., CH₃(CH₂)₉—) is an example of a C10 aliphatic radical. Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

In one embodiment, the present invention provides a porous membrane comprising at least one polysulfone polymer having structural units of Formula I.

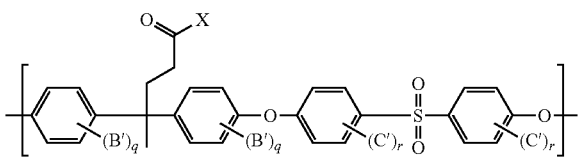

I wherein X is OH, NR¹R², or OR³;

R¹ and R² are independently at each occurrence hydrogen, a $C_1$-$C_{5000}$ aliphatic radical, a $C_3$-$C_{12}$ cycloaliphatic radical, a $C_3$-$C_{12}$ aromatic radical, a polypeptide, a combination thereof, or R¹ and R² taken together form a 5- or 6-membered aliphatic ring or a 5-membered aromatic ring;

$R^3$ is a $C_1$-$C_{20}$ aliphatic radical, $C_3$-$C_{12}$ cycloaliphatic radical, $C_3$-$C_{12}$ aromatic radical, or a combination thereof;

B' and C' are independently at each occurrence a nitro group, $C_1$-$C_{20}$ aliphatic radical, $C_3$-$C_{12}$ cycloaliphatic radical, $C_3$-$C_{12}$ aromatic radical, or a combination thereof; and q and r are independently at each occurrence 0 to 4.

A carboxylic functionalized polysulfone having structural units of Formula I wherein X is OH, may be obtained from a carboxylic group substituted bisphenol, such as bisphenol-4,4'-bis(4-hydroxyphenyl)valeric acid, commonly known as diphenolic acid. Polycondensation of diphenolic acid with DCDPS in polar aprotic solvents such as DMSO or NMP, using potassium carbonate as base, furnishes a carboxylated polysulfone. The sodium form polymer is highly polar and is partially soluble in hot DMSO or NMP. Treatment of the reaction mixture with ⅓ (HCl/THF) afforded the polymer in acid form, which is soluble in polar solvents such as THF, dioxane, and DMF.

The carboxylic acid containing polysulfone can be further functionalized. The corresponding acid chloride can be synthesized by treatment with oxalyl chloride in THF. Treatment of the acid chloride with amines may afford the corresponding amide while treatment with a hydroxyl ester provides the corresponding ester.

The polysulfones thus formed, may be characterized by number average molecular weight (Mn) and weight average molecular weight (Mw). The various average molecular weights Mn and Mw are determined by techniques such as gel permeation chromatography. In one embodiment, the Mn of the polymer may be in the range from about 10,000 grams per mole (g/mol) to about 1,000,000 g/mol. In another embodiment the Mn ranges from about 15,000 g/mol to about 200,000 g/mol. In yet another embodiment, the Mn ranges from about 20,000 g/mol to about 100,000 g/mol. In still a further embodiment, the Mn ranges from about 40,000 g/mol to about 80,000 g/mol.

In some embodiments, the membrane comprises a polysulfone polymer having structural units of Formula I blended with at least one additional polymer or oligomer. The polymer or oligomer may be blended with the polysulfone to impart different properties such as better heat resistance, impact strength, tensile strength, burst resistance, antifouling, biocompatibility, hyrdophilicity and the like. In particular the polysulfone may be blended with at least one polymer that may be hydrophilic or hydrophobic in nature. In some embodiments, the polysulfone is blended with a hydrophilic polymer.

The hyrdophilicity of the polymer blends may be determined by several techniques. One particular technique is that of determination of the contact angle of a liquid such as water on the polymer. It is generally understood that when the contact angle of water is less than about 40-50°, the polymer is considered to be hydrophilic, while if the contact angle is grater than about 80°, the polymer is considered to be hydrophobic.

One hydrophilic polymer that may be used is polyvinylpyrrolidone (PVP). In addition to, or in stead of, PVP it is also possible to use other hydrophilic polymers which are known to be useful for the production of membranes such as such as polyoxazoline, polyethyleneglycol, polypropylene glycol, polyethyleneglycolmonoalkyl ether, polypropyleneglycolmonoalkyl ether, polyethylene glycol monomoalkylester, polypropylene glycol monomoalkylester, copolymers of polyethyleneglycol with polypropylene glycol, water-soluble cellulose derivatives such as methylcellulose, polysorbate, polyethylene-polypropylene oxide copolymers and polyethyleneimines, polymethylvinyl ether, poly(N-isopropylacrylamide), polyvinylcaprolactam. PVP may be obtained by polymerizing a N-vinylpyrrolidone using standard addition polymerization techniques known in the art. One such polymerization procedure involves the free radical polymerization using initiators such as azobisisobutyronitrile (AIBN), optionally in the presence of a solvent. PVP is also commercially available under the tradenames PLASDONE® from ISP COMPANY or KOLLIDON® from BASF. Use of PVP in hollow fiber membranes is described in U.S. Pat. Nos. 6,103,117, 6,432,309, 6,432,309, and 5,543,465, incorporated herein by reference.

When the membrane comprises a blend of the polyarylethernitrile and PVP, the blend comprises from about 1% to about 80% polyvinylpyrrolidone in one embodiment, preferably 5-50%, and from about 2.5% to about 25% polyvinylpyrrolidone based on total blend components in another embodiment.

PVP may be crosslinked by known methods prior to use to avoid eluting of the polymer with the medium. U.S. Pat. No. 6,432,309, and U.S. Pat. No. 5,543,465, the disclose methods for crosslinking PVP. Some exemplary methods of crosslinking include, but are not limited to, exposing it to heat, radiation such as x-rays, ultraviolet rays, visible radiation, infrared radiation, electron beams; or by chemical methods such as, but not limited to, treating PVP with a crosslinker such as potassium peroxodisulfate, ammonium peroxopersulfate, at temperatures ranging from about 20° C. to about 80° C. in aqueous medium at pH ranges of from about 4 to about 9, and for a time period ranging from about 5 minutes to about 60 minutes. The extent of crosslinking may be controlled, by the use of a crosslinking inhibitor, for example, glycerin, propylene glycol, an aqueous solution of sodium disulfite, sodium carbonate, and combinations thereof.

In other embodiments, the polysulfone is blended with another polymer. Examples of such polymers that may be used include polysulfone, polyether sulfone, polyether urethane, polyamide, polyether-amide, and polyacrylonitrile.

In one particular embodiment, the at least one additional polymer contains an aromatic ring in its backbone and a sulfone moiety as well. These polymers include polysulfones, polyethersulfones or polyphenylenesulfones or copolymers therefrom. Such polymers are described in U.S. Pat. Nos. 4,108,837, 3,332,909, 5,239,043 and 4,008,203. Examples of commercially available polyethersulfones are RADEL R® (a polyethersulfone made by the polymerization of 4,4'-dichlorodiphenylsulfone and 4,4'-biphenol), RADEL A® (PES) and UDEL® (a polyethersulfone made by the polymerization of 4,4'-dichlorodiphenylsulfone and bisphenol A), both available from Solvay Chemicals.

In one embodiment, the membranes are water separation membranes and may be used for desalinating brackish and sea water, water softening, production of ultrapure water for electronics and pharmaceutical industries and industrial wastewater purification for food and beverage, electroplating and metal finishing, textiles and laundry, petroleum and petrochemical, and pulp and water industries. The application of the membranes in ultrafiltration and microfiltration systems for purifying feedwater to remove impurities, including suspended solids, is advantageous for the low protein binding of the membrane which reduces fouling.

The hyrdophilicity of the polymer blends may be determined by several techniques. One particular technique involves the measurement of albumin adsorption of a membrane to determine protein binding. As shown in FIG. 1, membranes of amide functionalized carboxylated polysulfone show reduced albumin adsorption compared to a commercial polyethersulfone and a carboxy-functionalized polyethersulfone. The commercial polyethersulfone (GE® Osmonics, 1.2 micron pore size) exhibited albumin adsorption of 166±5 ng/cm$^2$ and the carboxy-functionalized polyethersulfone membrane exhibited albumin adsorption of 383±18 ng/cm$^2$. A poly(vinylalcohol-co-vinylamine)-functional polyethersulfone membrane exhibited albumin adsorption of 30±2 ng/cm$^2$.

In another embodiment, the membranes may be used for filtering aqueous media, such as hemodialysis, water separation, biopharmaceuticals separation, virus filtration and chemical separations.

In another embodiment, the membranes or membrane-like structures may also be used for gas separation and purification. Gas separation may include the removal of certain gases from a gas flow stream such as, such as nitrogen, oxygen, or carbon dioxide to enrich the concentration of a gas. Gas purification may include the removal of impurities from the gas flow stream. Common impurities include moisture, oxygen, carbon dioxide, carbon monoxide, hydrocarbons and metal carbonyls.

The membrane may be designed to have specific pore sizes so that solutes having sizes greater than the pore sizes may not be able to pass through. A pore size refers to the radius of the pores in the active layer of the membrane. In one embodiment, the pore size ranges from about 0.5 to about 100 nm. In another embodiment, the pore size ranges from about 4 to about 50 nm. In another embodiment, the pore size ranges from about 4 to about 25 nm. In another embodiment, the pore size ranges from about 4 to about 15 nm. In another embodiment, the pore size ranges from about 5.5 to about 9.5 nm.

The membranes for use in the methods and apparatus of the present invention may be a hollow fiber or in a flat sheet or in a nanofiber mat configuration. The membrane may be fabricated into symmetric or asymmetric configurations by various techniques some of which include, but are not limited to: dry-phase separation membrane formation process in which a dissolved polymer is precipitated by evaporation of a sufficient amount of solvent to form a membrane structure; wet-phase separation membrane formation process in which a dissolved polymer is precipitated by immersion in a non-solvent bath to form a membrane structure; dry-wet phase separation membrane formation process which is a combination of the dry and the wet-phase formation processes; thermally-induced phase-separation membrane formation process in which a dissolved polymer is precipitated or coagulated by controlled cooling to form a membrane structure. Further, after the formation of a membrane, it may be subjected to a membrane conditioning process or a pretreatment process prior to its use in a separation or filtration application. Representative processes may include thermal annealing to relieve stresses or pre-equilibration in a solution similar to the feed stream the membrane will contact.

Without being bound to theory, it is understood that water and gas filtration works on the principle of the diffusion of solutes across a porous membrane. During filtration, a feed stream that is to be purified is contacted with a membrane.

In certain applications, a filtration apparatus generally comprises a plurality of membranes that are stacked or bundled together to form a module. The gas or fluid to be purified is fed into a feed line, which is then allowed to pass through filtration lines, while coming in contact with the membranes. In certain apparatuses, filtration may use the normal osmosis process, wherein the gas or fluid to be purified moves from an area of low solute concentration, through a membrane to an area of high solute concentration. In other apparatuses a reverse osmosis process may be used wherein the gas or fluid stream may be pumped under pressure, thus causing a pressure differential between a filtered and an unfiltered stream. During contact, the concentration gradient between the filtered and unfiltered stream and the membrane pore sizes causes selected solutes to diffuse through the membranes. In certain apparatuses, the membranes may be contained within and integral to the main purification apparatus, such as in a membrane bioreactor. In other apparatuses, the membranes may be contained in a separate unit and may be used in an intermediate pumping or filtration step.

EXPERIMENTAL

Example 1

Synthesis of Carboxy-functional Polyethersulfone

To a three neck flask equipped with a Dean-Stark Condenser, a dropping funnel, and a mechanical stirrer was added diphenolic Acid (286.31 g, 1 mol), a 50.3% aqueous sodium hydroxide solution, (238.55 g solution, 120.00 g NaOH, 3 mol), dimethylsulfoxide (DMSO, 600 ml), toluene (500 ml) The solution was heated to 155° C. as water and toluene were continually removed by azeotropic distillation. After 10 hours, 4,4'-sulfonylbis(chlorobenzene) (287.162 g, 1 mol) was added and the temperature raised to 165° C. and heated at that temperature for 6 hours. The reaction mixture was cooled and carefully treated with a HCl/THF solution comprising 750 ml of concentrated HCl dissolved in 3100 ml of tetrahydrofuran to protnate any remaining carboxylic acid salt. The resulting solution was precipitated into an excess of water to produce a white solid that was filtered and washed with methanol then dried in vacuo to afford the carboxy-functional polyethersulfone. Molecular weight (GPC, polystyrene standards, $CHCl_3$): Mw=157,416, Mn=99,023, Mw/Mn=1.54; Tg (DSC): 201.89° C.

Example 2

Preparation of a Carboxy-Functional Polyethersulfone Membrane

The polymer from example 1 was dissolved in dimethylacetamide. A 1-mil film was cast onto a glass plate and directly immersed into a water bath causing immediate precipitation of a porous film, which was allowed to air-dry yielding a carboxy-functional polyethersulfone membrane used in the following example, Example 3.

Example 3

Functionalization of Carboxy-Functional Polyethersulfone Membrane

An activation solution was prepared by combining equal portions of a 0.39M solution of 3-(3-Dimethylaminopropyl)-1-ethylcarbodiimide hydrochloride (EDC) produced by dissolving 0.2050 g of EDC (191.70 g/mol; 1.06 mmol) of in 2.73 g of water and a 0.17 M solution of N-hydroxysuccinimide (NHS) produced by dissolving 0.053 g (115.09 g/mol; 0.46 mmol) in 2.74 g of water. A nucleophile solution was prepared by dissolving 1.0866 g of N-methylglucamine in 10.44 g of an aqueous pH=8.2 buffer solution. A 1-cm$^2$ sample of the porous, carboxy-functional polysulfone membrane from Example 2 was immersed in the activation solution for a period of 5 minutes to produce an activated membrane. The activated membrane was then placed in the nucleophile solution for a period of 5 minutes and then soaked overnight in deionized water to produce an N-methylglucamine-functional polyethersulfone membrane. A control sample was prepared by soaking the phase inverted, carboxy-functional polyethersulfone membrane from example 2 in deionized water overnight. The contact angles of the N-methylglucamine-functional polyethersulfone membrane (example 3): 50°±5.7°; Control 68°±4.9° demonstrating increased membrane hydrophilicity through post functionalization.

Example 4

Preparation of a Carboxy-Functional Polyethersulfone Membrane

The polymer from example 1 (20 g) was dissolved in 80 ml of a 60/40-wt./wt. mixture of N-methylpyrollidinone/triethylene glycol. The solution was filtered free of gel particles and coated as 10 mil thick film onto a glass plate. The film was immersed immediately into a (80/20-wt./wt.) water/diethylene glycol coagulation bath. The membranes were soaked overnight in water. Scanning electron micrographs of the showed the formation of an asymmetric membrane with 1-20 nm pores on the upper surface of the membrane and 10-50 micron pores on the bottom surface.

Example 5

Synthesis of Poly(vinylalcohol-co-vinylamine)-Functional Polyethersulfone Membrane A membrane from Example 4 was soaked for 2 hours in 100 ml of an aqueous solution containing 1.0 g of 1-cyclohexyl-3-(2-morphilinoethyl)carbodiimide metho-p-toluenesulfonate (423.57 g/mol) and a 20.0 g aqueous solution of poly(vinylalcohol-co-vinylamine) (6 mol % vinylamine repeat units). The polymer was then washed extensively with deionized water, then soaked overnight in deionized water.

Example 6

Measurement of Albumin Adsorption

The membrane samples produced above as well as an unfunctionalized polyethersulfone control sample (GE Osmonics, 1.2 micron pore size) were tested for human serum albumin (HSA) adsorption binding by the following procedure: An HSA working solution (20 μg/ml) solution in PBS buffer was prepared and stored on ice. A 24-well microplate containing a membrane samples was incubated with a solution of PBS buffer (pH=7.2) for 15-30 minutes. The buffer was removed and the well filled with 500 μl protein working solution and incubated for 30 minutes. The protein solution was removed and 500 μl 2% rabbit serum in PBS buffer (pH=7.2) and incubated at room temperature for 30 minutes. The rabbit serum was removed and each sample washed with 1000 μl of PBS twice. A solution of horseradish peroxidase (HRP)-conjugated rabbit antibody against human serum albumin (500 μl, Abcam Inc, Ab7394; 1:50,0000 dilution in 2% rabbit serum in PBS) The plate was incubated at room temperature in the dark for 1 h. The antibody solution was removed and the sample washed with 1000 μl of PBS buffer 5 times. Each sample was then incubated with 500 μl of HRP substrate solution, (Sureblue TMB (3,3',5,5'-tetramethylbenzidine solution); KPL Corporation) in the dark for 15 minutes. After such time 500 μl of HRP stop solution was added. 150 μl solution form the well was then transferred to a clear bottom 96-well plate and the adsorption measured at 450 nm using an ELISA reader subtracting the stop solution as a control.

Using this method, the HSA adsorption of various membranes was measured. Whereas a commercial polyethersulfone (GE-Osmonics, 1.2 micron pore size) exhibited albumin adsorption of 166±5 ng/cm² and a carboxy-functionalized polyethersulfone membrane bound 383±18 ng/cm², the poly(vinylalcohol-co-vinylamine)-functional polyethersulfone membrane adsorbed 30 ng/cm²±2 ng/cm². Thus, the HSA protein binding of polyethersulfone is less than the carboxy functionalized polyether sulfone, due to the presence protein-binding carboxylic acid groups in the latter. These carboxylic acid groups enable post-functionalization with hydrophilic polymers, such as a polyvinylalcohol copolymer, to produce membranes with low protein binding.

The invention claimed is:

1. A method for water filtration, said method comprising:
contacting a protein containing water stream with a hydrophilic membrane comprising a polysulfone having structural units of Formula I

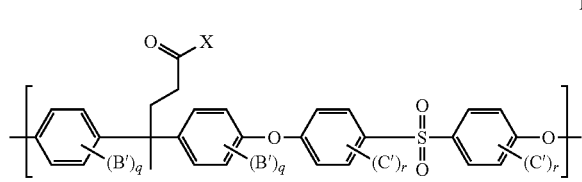

wherein X is $NR^1R^2$;

$R^1$ and $R^2$ are independently at each occurrence hydrogen, a $C_1$-$C_{5000}$ aliphatic radical, a $C_3$-$C_{12}$ cycloaliphatic radical, a $C_3$-$C_{12}$ aromatic radical, a polypeptide, a combination thereof, or $R^1$ and $R^2$ taken together form a 5- or 6-membered aliphatic ring or a 5-membered aromatic ring;

B' and C' are independently at each occurrence a nitro group, $C_1$-$C_{20}$ aliphatic radical, $C_3$-$C_{12}$ cycloaliphatic radical, $C_3$-$C_{12}$ aromatic radical, or a combination thereof;

q and r are independently at each occurrence 0 to 4; and wherein said hydrophilic membrane has a contact angle of water less than 40°; and producing a retentate and water as permeate.

2. The method of claim 1, wherein the membrane comprises a blend of the polysulfone and at least one other polymer or oligomer.

3. The method of claim 1 wherein the membrane further comprise at lest one hydrophilic polymer.

4. The method of claim 3 wherein the hydrophilic polymer is polyvinyl pyrrolidone.

5. The method of claim 1 wherein q and r are each 0.

6. The method of claim 1 wherein X is an amide derived from N-methylglucamine, poly(vinylalcohol-co-vinylamine), or a combination thereof.

7. A water filtration apparatus comprising at least one hydrophilic membrane comprising a polysulfone having structural units of Formula I

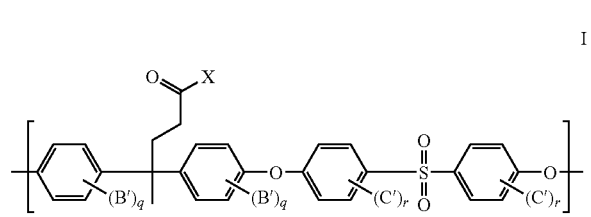

wherein X is $NR^1R^2$;

$R^1$ and $R^2$ are independently at each occurrence hydrogen, a $C_1$-$C_{5000}$ aliphatic radical, a $C_3$-$C_{12}$ cycloaliphatic radical, a $C_3$-$C_{12}$ aromatic radical, a polypeptide, a combination thereof, or $R^1$ and $R^2$ taken together form a 5- or 6-membered aliphatic ring or a 5-membered aromatic ring;

B' and C' are independently at each occurrence a nitro group, $C_1$-$C_{20}$ aliphatic radical, $C_3$-$C_{12}$ cycloaliphatic radical, $C_3$-$C_{12}$ aromatic radical, or a combination thereof; and q and r are independently at each occurrence 0 to 4; and wherein said hydrophilic membrane has a contact angle of water less than 40°.

8. The water filtration apparatus of claim 7 wherein the membrane comprises a blend of the polysulfone and at least one other polymer or oligomer.

9. The apparatus of claim 7 wherein the membrane further comprise at lest one hydrophilic polymer.

10. The apparatus of claim 9 wherein the hydrophilic polymer is polyvinyl pyrrolidone.

11. The apparatus of claim 7 wherein the membrane is a flat sheet, a hollow fiber, or a combination thereof.

12. The apparatus of claim 7 wherein q and r are each 0.

13. The apparatus of claim 7 wherein X is an amide derived from N-methylglucamine, poly(vinylalcohol-co-vinylamine), or a combination thereof.

14. A gas separation apparatus comprising at least one hydrophilic membrane comprising a polysulfone having structural units of Formula I

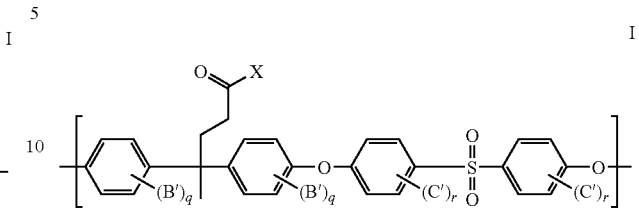

wherein X is $NR^1R^2$;

$R^1$ and $R^2$ are independently at each occurrence hydrogen, a $C_1$-$C_{5000}$ aliphatic radical, a $C_3$-$C_{12}$ cycloaliphatic radical, a $C_3$-$C_{12}$ aromatic radical, a polypeptide, a combination thereof, or $R^1$ and $R^2$ taken together form a 5- or 6-membered aliphatic ring or a 5-membered aromatic ring;

B' and C' are independently at each occurrence a nitro group, $C_1$-$C_{20}$ aliphatic radical, $C_3$-$C_{12}$ cycloaliphatic radical, $C_3$-$C_{12}$ aromatic radical, or a combination thereof;

q and r are independently at each occurrence 0 to 4; and wherein said hydrophilic membrane has a contact angle of water less than 40°.

15. The apparatus of claim 14 wherein the membrane comprises a blend of the polysulfone and at least one other polymer or oligomer.

16. The apparatus of claim 14 wherein the membrane further comprise at lest one hydrophilic polymer.

17. The apparatus of claim 16 wherein the hydrophilic polymer is polyvinyl pyrrolidone.

18. The apparatus of claim 14 wherein the membrane is a flat sheet, a hollow fiber, or a combination thereof.

19. The apparatus of claim 14 wherein q and r are each 0.

20. The apparatus of claim 14 wherein X is an amide derived from N-methylglucamine, poly(vinylalcohol-co-vinylamine), or a combination thereof.

* * * * *